Oct. 25, 1966 R. F. NOBLE 3,281,656

SEMICONDUCTOR BREAKDOWN DIODE TEMPERATURE COMPENSATION

Filed July 2, 1963

INVENTOR.
RUPERT F. NOBLE
BY
Shenier & O'Connor
ATTORNEYS

United States Patent Office 3,281,656 Patented Oct. 25, 1966

3,281,656
SEMICONDUCTOR BREAKDOWN DIODE TEMPERATURE COMPENSATION

Rupert F. Noble, Phoenix, Ariz., assignor to Nuclear Corporation of America, Phoenix, Ariz., a corporation of Delaware Filed July 2, 1963, Ser. No. 292,342
10 Claims. (Cl. 323—75)

My invention relates to semiconductor breakdown diode temperature compensation and more particularly to a circuit for producing a reference voltage which is substantially independent of temperature change or which may have any desired voltage-temperature characteristic.

There are known in the prior art breakdown diodes which are used to regulate voltage sources to provide relatively constant reference voltages. Semiconductor breakdown diodes of this type exhibit a voltage-temperature dependence which limits their usefulness in applications wherein either external temperature changes or self-heating produce voltage variations which are beyond the tolerable limits for the particular application. It has been suggested in the prior art that this positive temperature coefficient of breakdown diodes be compensated for by the use of one or more forwardly-conducting, series rectifier junctions having negative temperature coefficients. Such a temperature compensation system however introduces the defect that the forward-biased diodes exhibit a nonlinear temperature versus temperature coefficient characteristic so that this compensation is not satisfactory over any relatively wide range of temperatures.

I have invented a semiconductor breakdown diode temperature compensating system which provides a more uniform compensation than is provided by compensating systems of the prior art. My compensating system can be used over a wider range of temperatures than is practicable with compensating systems of the prior art. A circuit embodying my arrangement provides a reference voltage which is substantially independent of temperature over a relatively wide range. My system permits the provision of a reference voltage having, if desired, a temperature characteristic which is predetermined and which may be either positive or negative.

One object of my invention is to provide a semiconductor breakdown diode temperature compensating arrangement which overcomes the defects of temperature compensating systems of the prior art.

Another object of my invention is to provide a semiconductor breakdown diode temperature compensating arrangement which provides a more uniform compensation than do systems of the prior art.

A further object of my invention is to provide a semiconductor breakdown diode temperature compensating system which provides relatively uniform compensation over a wide range of temperatures.

Still another object of my invention is to provide a circuit for producing a reference voltage which is substantially independent of temperature.

A still further object of my invention is to provide a circuit which produces a reference voltage having any predetermined desired temperature-voltage characteristic.

Other and further objects of my invention will appear from the following description.

In general my invention contemplates the provision of a semiconductor breakdown diode temperature compensating arrangement in which I connect a series circuit of an output impedance and a breakdown diode in parallel with a series circuit having at least one breakdown diode across a current source with the diodes so selected that the voltage change per degree of temperature change, owing to the breakdown diodes in each circuit, produces an output voltage across the impedance having substantially no change or having a predetermined change in voltage with each degree of change in temperature.

In the accompanying drawings which form part of the instant specification and which are to be read in conjunction therewith and in which like reference numerals are used to indicate like parts in the various views.

Figures 1, 2, 3, 4, 5:
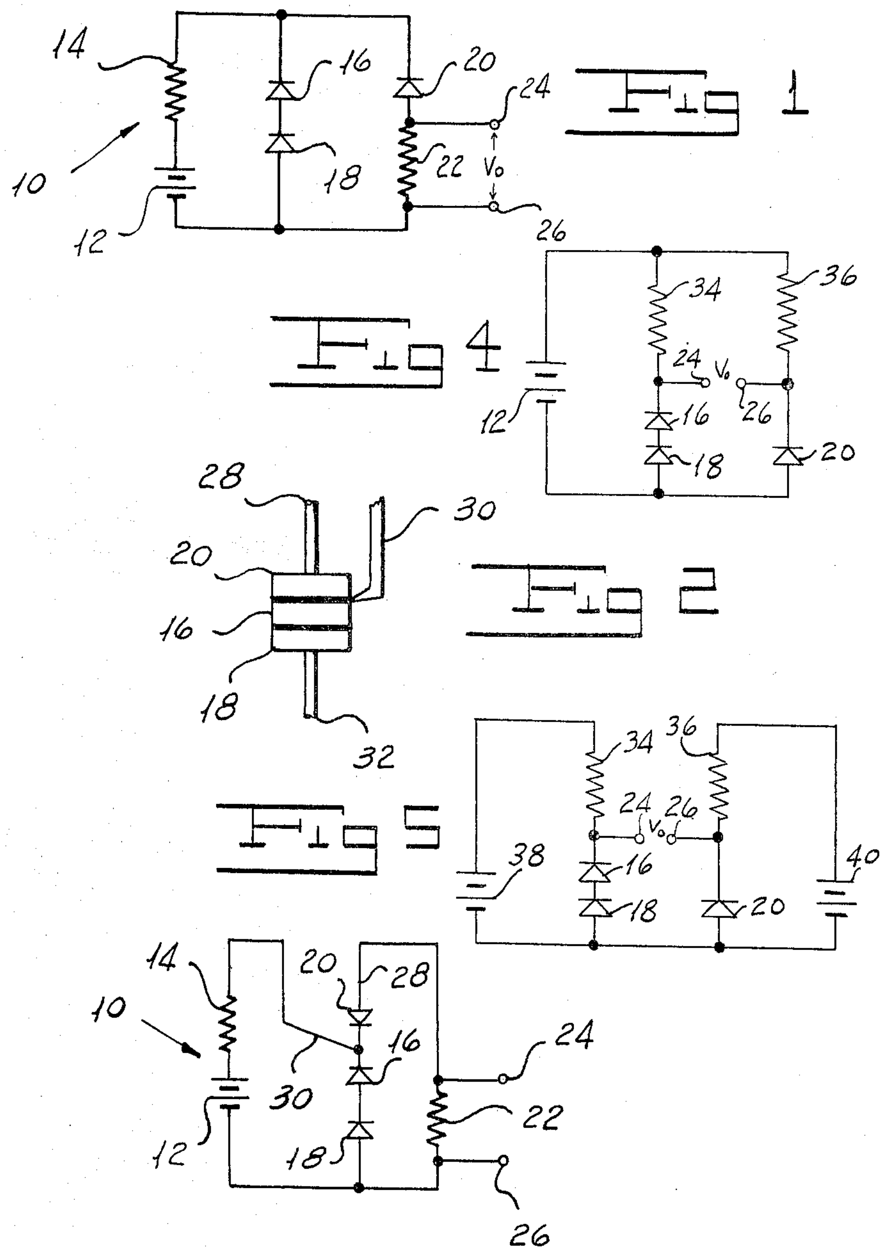
FIGURE 1 is a schematic view of one form of my semiconductor breakdown diode temperature compensating system.
FIGURE 2 is an elevation of one particular embodiment of an element comprising part of my semiconductor breakdown diode temperature compensating system.
FIGURE 3 is a schematic view of a form of my semiconductor breakdown diode temperature compensating system incorporating the element illustrated in FIGURE 2.
FIGURE 4 is a schematic view of a modified form of my semiconductor breakdown diode temperature compensating system.
FIGURE 5 is a schematic view of a still further form of my semiconductor breakdown diode temperature compensating system.

More particularly referring now to FIGURE 1 of the drawings, one form of my semiconductor breakdown diode temperature compensating system includes a current source indicated generally by the reference character 10 including a battery 12 and a current-limiting resistor 14. I connect respective breakdown diodes 16 and 18 having particular voltage and temperature coefficient characteristics such as will be described hereinafter, in series across the current source 10. I connect a breakdown diode 20 having particular current and temperature coefficient characteristics to be described in series with an output impedance such as a resistor 22 across the current source 10 in parallel with the diodes 16 and 18. Respective output terminals 24 and 26 permit the output voltage $V_o$ to be picked off the resistor 22.

I have discovered that by selecting the diodes 16 and 18 to have breakdown voltages and certain temperature coefficients with relation to the breakdown voltage and temperature coefficient of diode 20, I can produce an output voltage $V_o$ across resistor 22 having a desired temperature-voltage characteristic.

Let us consider the example in which I wish to produce a reference voltage $V_o$ which is substantially independent of temperature. Now assuming that the diodes 16 and 18 each is a 15-volt diode and that each has a temperature coefficient of 0.06% per °C., then for each degree of temperature change the voltage change across the branch including diodes 16 and 18 will be 0.06%×30 volts=0.018 volt per °C. This follows from the fact that where two such elements as the diodes 16 and 18 are connected in series, the series circuit has the same temperature coefficient as the individual components. Under these conditions I select the diode 20 to be a 25-volt diode, for example, with a temperature coefficient of 0.072% per °C. Under these conditions it will be clear that for each degree of temperature change, the voltage across diode 20 will change by 0.072%×25 volts=0.018 volt. That is, with these values, precisely the same voltage change, owing to the diode temperature coefficients, occurs in each of the diode-containing branches of the circuit. Further under these conditions the voltage $V_o$ will be the difference between the voltage across the branch including diodes 16 and 18 and the voltage across diode 20 or, in the particular case under consideration, 5 volts. This output voltage $V_o$ is substantially independent of temperature.

While in the particular example discussed above I have disclosed two diodes, 16 and 18, as being connected in series in their branch, it will be understood that theoretically a single diode could be used if one could be selected which had the proper voltage and temperature coefficient required to produce the desired result in combination with the diode 20. Further, more than two diodes might be employed and they need not all have the same voltage or temperature coefficient. In this latter case, the branch voltage would be the sum of the individual diode voltages and the temperature coefficient would have to be arrived at with consideration of the individual temperature coefficients with relation to the diode voltages.

With my breakdown diode temperature compensation system, I may also produce a temperature-voltage characteristic for the output voltage $V_o$ which is either positive or negative. As a general rule, regardless of the signs of the characteristics, if all diodes have the same polarities, then for a particular coefficient of the branch, including diodes 16 and 18, if the coefficient of diode 20 is less than that required to produce an output voltage $V_o$ which is independent of temperature, then the output voltage $V_o$ has a positive temperature coefficient. On the other hand, if the temperature coefficient of diode 20 is greater than that which would be required to produce an output voltage $V_o$ which is independent of temperature, the resultant temperature coefficient of the output voltage $V_o$ would be negative. Thus it will be appreciated that by use of my arrangement I may produce an output voltage $V_o$ which is substantially independent of temperature change, which has a positive temperature coefficient or which has a negative temperature coefficient.

Referring now to FIGURE 2, I have shown a particular embodiment of the diode arrangement in which the diodes 20, 16 and 18 are mounted in contact with each other in a sandwich configuration. This particular arrangement has the advantage of thermal integrity so that all the diodes are at substantially the same temperature. In this embodiment, a lead 28 provides the connection to the output impedance 22, a lead 30 affords a common connection to the current-limiting resistor 14 and a lead 32 provides the return connection.

Referring now to FIGURE 3, I have illustrated the schematic equivalent for the particular embodiment shown in FIGURE 2 in which I have indicated like parts by the same reference characters as those employed in FIGURES 1 and 2. It will be appreciated that this circuit is the electrical equivalent of that shown in FIGURE 1.

Referring to FIGURE 4, I have illustrated a modified form of my semiconductor breakdown diode temperature compensating system wherein I divide the current source by employing respective resistors 34 and 36 in an arrangement forming a bridge. It is to be understood also that the single battery 12 of the form of my circuit shown in FIGURE 4 may be replaced by two individual voltage sources 38 and 40 as shown in FIGURE 5.

In operation of my system for compensating for semiconductor breakdown diode voltage change with temperature, if I desire, for example, to produce a voltage $V_o$ which is substantially independent of temperature change, I select two diodes, 16 and 18, to provide a voltage change per degree of temperature for this branch which is the same as the voltage change per degree of temperature change across the diode 20. Under these conditions, since the same change as occurs in the branch including diodes 16 and 18 occurs in the diode 20, voltage $V_o$ remains substantially constant.

If I wish to provide a voltage $V_o$ which changes either positively or negatively with temperature change by a predetermined amount, I select the diode 20 accordingly, assuming the same diodes 16 and 18 are employed. I have discovered that if all of the diodes have the same polarity coefficient then, regardless of the signs of the coefficient, if the coefficient of the diode 20 is less than that which would produce no change of $V_o$ with temperature, then $V_o$ will increase with increasing temperature. If, on the other hand, I select the coefficient of diode 20 to be greater than that which would produce no change of $V_o$ with temperature then $V_o$ will become less with increasing temperature.

It will be seen that I have accomplished the objects of my invention. I have provided a semiconductor breakdown diode temperature compensating system which overcomes the defects of temperature compensating systems of the prior art. My system provides a uniform compensation over a relatively wide range of temperatures. A circuit incorporating my system can produce an output voltage which is substantially constant over a relatively wide range of temperatures. Alternately, I may arrange my system to afford any desired change in the output voltage with change in temperature.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A temperature compensated voltage supply including in combination a first voltage regulator providing a voltage of a given magnitude, said first voltage regulator having a certain temperature coefficient, a second voltage regulator providing a voltage greater than that of the first regulator, said second regulator having a predetermined temperature coefficient which is a function of the ratio of the first and second regulator voltages, and of the temperature coefficient of the first regulator and means including the regulators for providing an output voltage which is equal to the difference of the regulator voltages.

2. A temperature compensated voltage supply including in combination a first voltage regulator providing a voltage of a given magnitude, said first voltage regulator having a certain temeprature coefficient, a second voltage regulator providing a voltage greater than that of the first regulator, said second regulator having a predetermined temperature coefficient which is equal to the product of the ratio of said voltages and the certain temperature coefficient and means including the regulators for providing an output voltage which is equal to the difference of the regulator voltages and which is substantially independent of temperature.

3. A temperature compensated voltage supply including in combination a first voltage control providing a voltage of a given magnitude, said first voltage control having a certain temperature coefficient, a second voltage control comprising a breakdown diode, said second control providing a voltage greater than that of the first control, said second control having a predetermined temperature coefficient which is a function of the ratio of the first and second voltages and of the coefficient of the first control and means including said controls for providing an output voltage which is equal to the difference of the voltages.

4. A temperature compensated voltage supply including in combination a first voltage governor comprising a first breakdown diode, said first voltage governor providing a voltage of a given magnitude, said first voltage governor having a certain temperature coefficient, a second voltage governor comprising a second breakdown diode, said second voltage governor providing a voltage greater than that of the first governor, said second governor having a predetermined temperature coefficient which is a function of the ratio of the first and second voltages and of the coefficient of the first source, means including the governors for providing an output voltage which is equal to the difference of the voltages and means mounting said diodes in contact with each other.

5. A circuit for providing a reference voltage having a predetermined voltage-temperature characteristic including in combination a current source, a first branch circuit comprising a first voltage regulating device having a known voltage-temperature coefficient and an impedance connected in series, a second branch circuit comprising a second voltage regulating device having a voltage-temperature coefficient and an impedance connected in series, said second voltage regulating device having a voltage-temperature coefficient with a predetermined relationship to the coefficient of the first device and means for connecting said branch circuits across said current source whereby the resulting voltage across said impedance has said predetermined characteristic.

6. A circuit for providing a reference voltage having a predetermined voltage-temperature characteristic including in combination a current source, a first branch circuit comprising first voltage regulating means providing a given voltage and an impedance connected in series, said first voltage regulating means having a known voltage-temperature coefficient, a second branch circuit comprising second voltage regulating means providing a voltage greater than the voltage of said first voltage regulating means, said second voltage regulating means having a voltage-temperature coefficient which is a function of the ratio of the voltages of said voltage regulating means and of said known voltage-temperature coefficient and means for connecting said branch circuits across said current sources whereby the resulting voltage across said impedance is equal to the difference of the voltages of said devices and which has said predetermined characteristic.

7. A circuit for providing a reference voltage which is substantially independent of temperature including in combination a current source, a first branch circuit comprising first voltage regulating means providing a given voltage and an impedance connected in series, said first voltage regulating means having a known voltage-temperature coefficient, a second branch circuit comprising second voltage regulating means providing a voltage which is greater than the voltage of said first regulating means, said second voltage regulating means having a voltage-temperature coefficient which is equal to the product of the ratio of voltages of said first and second regulating means and said known coefficient and means connecting said branch circuits across said source whereby the resulting voltage across said impedance is substantially independent of temperature.

8. A circuit for providing a reference voltage which is substantially independent of temperature including in combination a current source, a first branch circuit comprising voltage regulating means providing a given voltage and an impedance connected in series, said voltage regulating means having a known voltage-temperature coefficient, a second branch circuit comprising a plurality of series-connected breakdown diodes, said second branch circuit providing a voltage which is greater than the voltage of said first regulating means, said second branch circuit having a voltage-temperature coefficient which is equal to the product of the ratio of voltages of said regulating means and said second branch circuit and said known coefficient and means connecting said branch circuits across said source whereby the resulting voltage across said impedance is substantialy independent of temperature.

9. A circuit for providing a reference voltage which is substantially independent of temperature including in combination a current source, a first branch circuit comprising a first breakdown diode and an impedance connected in series, said first breakdown diode providing a given voltage and having a known voltage-temperature coefficient, a second branch circuit comprising a second breakdown diode, said second branch circuit providing a voltage which is greater than the voltage of said first breakdown diode, said second branch circuit having a voltage-temperature coefficient which is equal to the product of the ratio of voltages of said first breakdown diode and said second branch circuit and said known coefficient, means connecting said branch circuits across said source whereby the resulting voltage across said impedance is substantially independent of temperature and means mounting said diodes in contact with each other.

10. A circuit for providing a reference volatge which is substantially independent of temperature including in combination a current source, a first branch circuit comprising a breakdown diode and an impedance connected in series with a common terminal, said first breakdown diode providing a given voltage and having a known voltage-temperature coefficient, a second branch circuit comprising a second breakdown diode and a second impedance connected in series with a common terminal, said second branch circuit providing a voltage which is greater than the voltage of said first breakdown diode, said second branch circuit having a voltage-temperature coefficient which is equal to the product of the ratio of voltages of said first breakdown diode and said second branch circuit and said known coefficient, and means connecting said branch circuits across said source to form a bridge wherein said common terminals provide an output voltage which is substantially independent of temperature.

No references cited.

JOHN F. COUCH, *Primary Examiner.*

K. D. MOORE, *Assistant Examiner.*